July 29, 1952  A. L. HALE ET AL  2,605,003
COUPLING FOR RAILROAD VEHICLES
Filed June 2, 1950  7 Sheets-Sheet 2
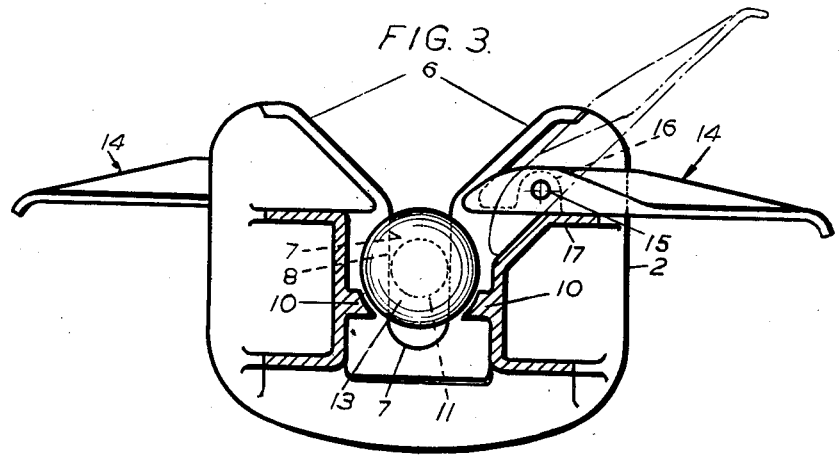
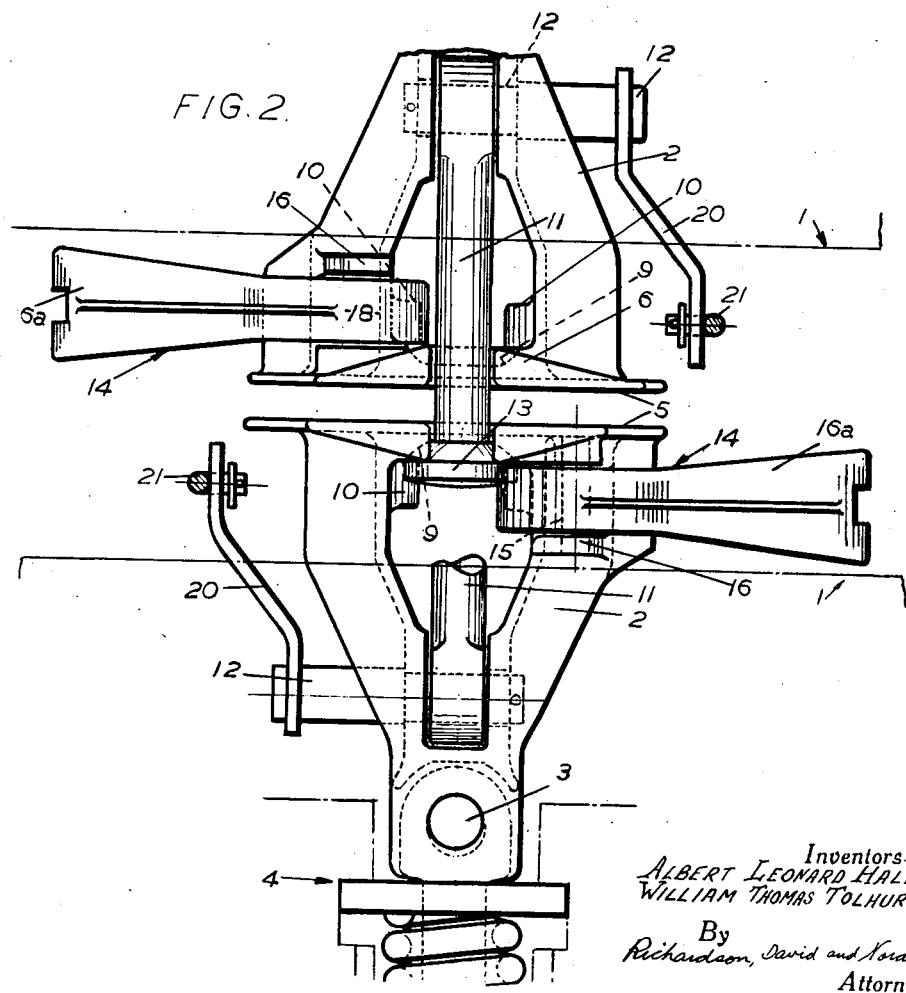
Inventors
ALBERT LEONARD HALE
WILLIAM THOMAS TOLHURST
By
Richardson, David and Nordon
Attorneys

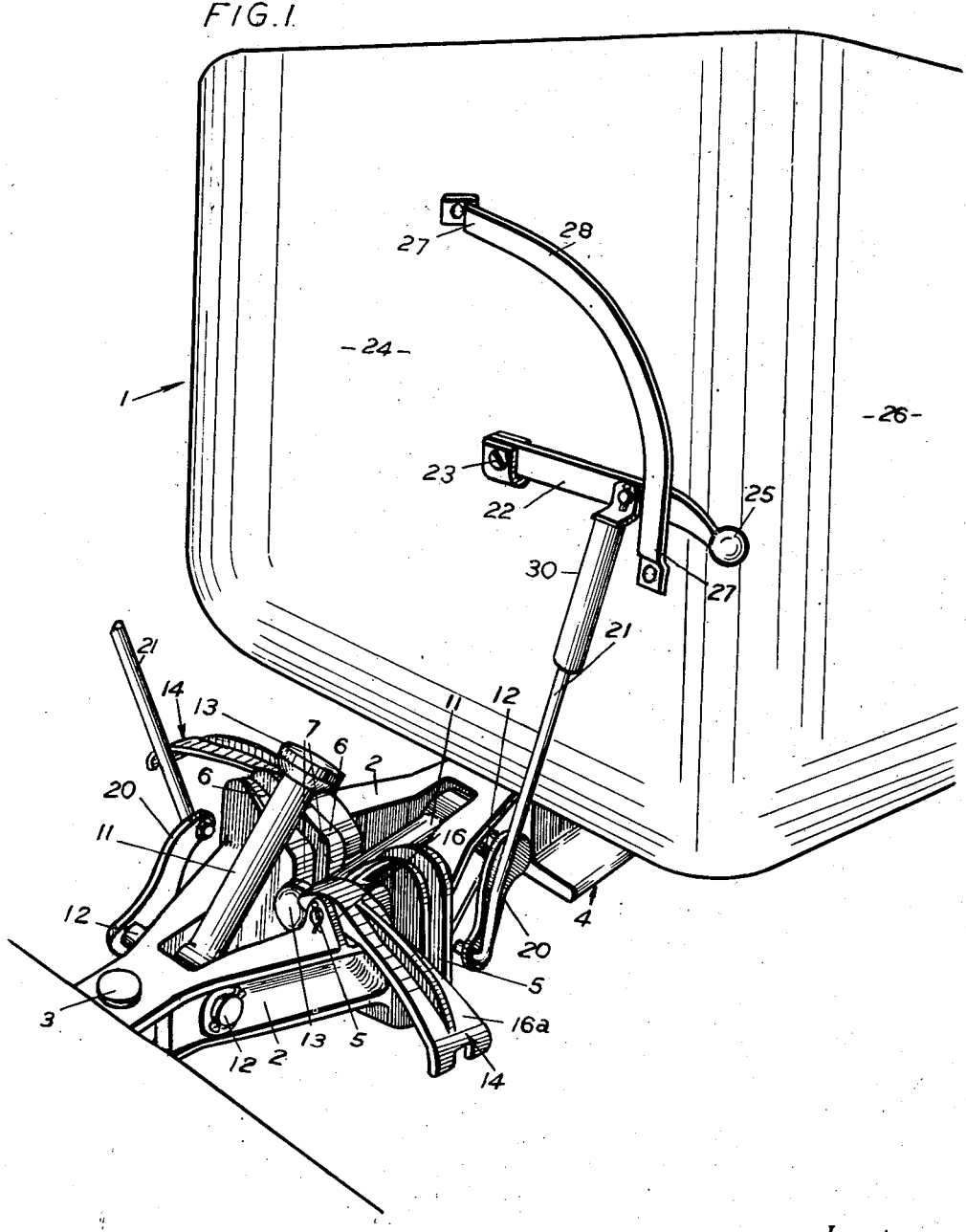

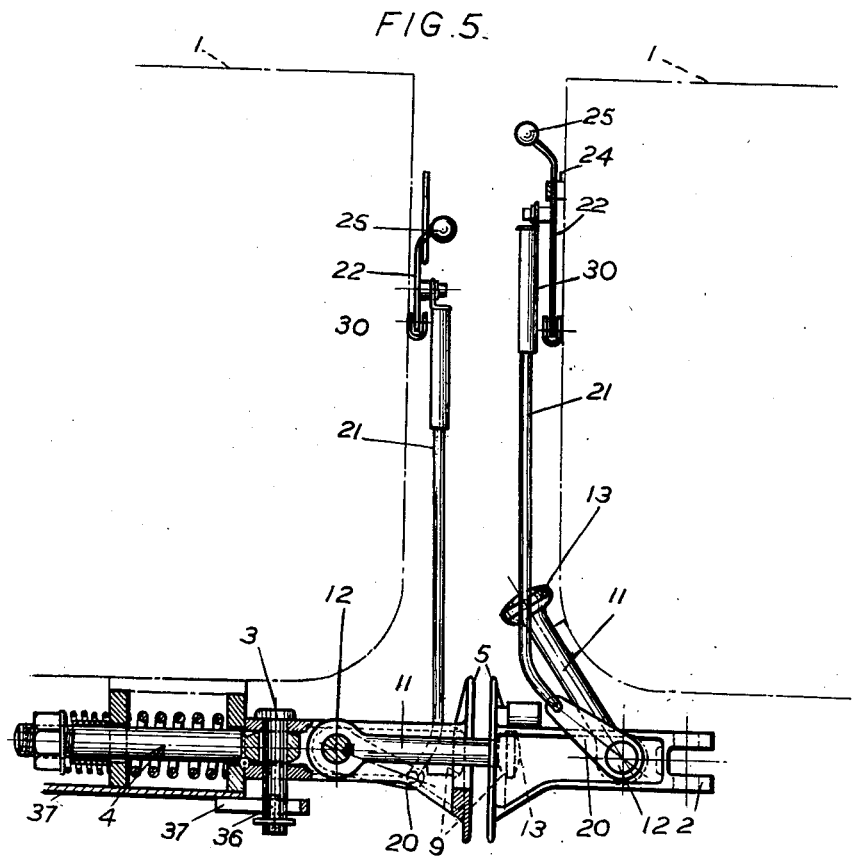

July 29, 1952     A. L. HALE ET AL     2,605,003
COUPLING FOR RAILROAD VEHICLES
Filed June 2, 1950                          7 Sheets-Sheet 4
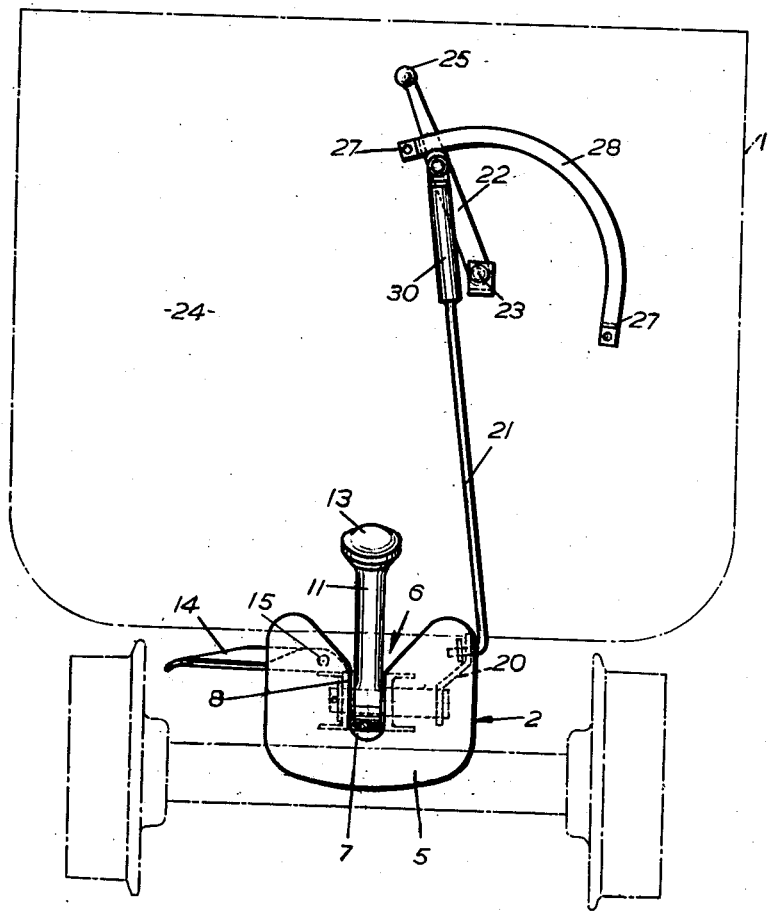
Inventors
ALBERT LEONARD HALE
WILLIAM THOMAS TOLHURST
By
Richardson, David and Nordon
Attorneys Inventors:
ALBERT LEONARD HALE
WILLIAM THOMAS TOLHURST
By
Richardson, David and Nerdon
Attorneys July 29, 1952  A. L. HALE ET AL  2,605,003
COUPLING FOR RAILROAD VEHICLES
Filed June 2, 1950  7 Sheets-Sheet 6
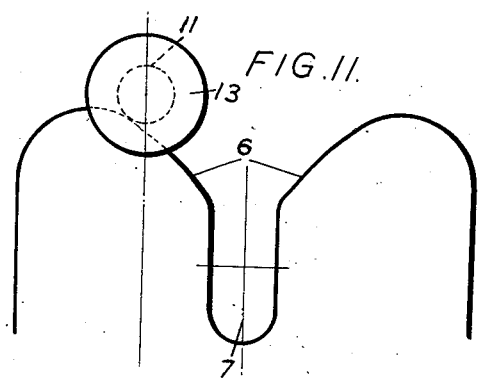
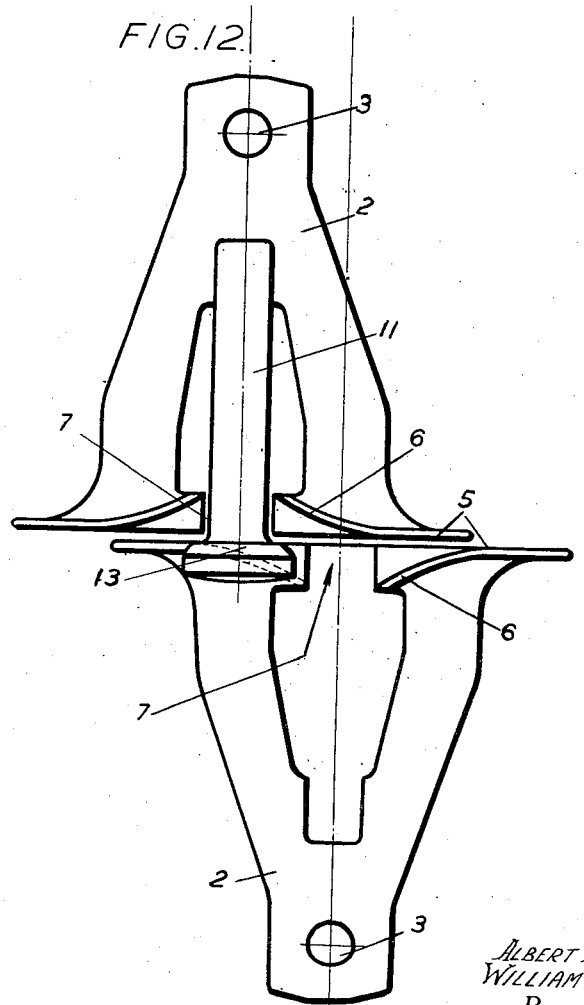
Inventors
ALBERT LEONARD HALE
WILLIAM THOMAS TOLHURST
By
Richardson, David and Nordon
Attorneys July 29, 1952 — A. L. HALE ET AL — 2,605,003
COUPLING FOR RAILROAD VEHICLES
Filed June 2, 1950 — 7 Sheets-Sheet 7

Inventors:
ALBERT LEONARD HALE
WILLIAM THOMAS TOLHURST
By Richardson, David and Nordon
Attorneys Patented July 29, 1952

2,605,003

UNITED STATES PATENT OFFICE 2,605,003

COUPLING FOR RAILROAD VEHICLES

Albert L. Hale and William T. Tolhurst, Tipton, England, assignors to W. G. Allen and Sons (Tipton) Limited, Princes End Works, Tipton, Staffordshire, England Application June 2, 1950, Serial No. 165,684
In Great Britain February 3, 1949

5 Claims. (Cl. 213—96)

This invention has reference to couplings for rail road vehicles and is particularly, although not exclusively, applicable to rail road vehicles used for colliery work and hereinafter referred to as "mine cars." A coupling to which the invention relates consists of two buffing or contacting members adapted to be connected, usually pivotally, to draw gear of two adjoining mine cars respectively, and being adapted to be coupled and uncoupled. In use one such buffing member is usually employed at each end of a vehicle. A coupling is known in which the buffing members are coupled by a removable member; this has the disadvantage that the coupling member can be either lost or removed by an unauthorized person.

For certain schemes of colliery mechanisation a coupling for mine cars is required which will enable a train of cars to be passed through a rotary tippler, each car being completely rotated in turn without having to uncouple the cars. In addition, it is most desirable that the part couplings at each end of each car are identical so that the cars may be turned round without affecting the coupling-up. In addition, it is desirable that the coupling parts should be flush with or behind the face of the buffer when uncoupled to enable the cars to be taken into the cages for lifting to the surface. This applies particularly to cars used for conveying mine refuse, such as rock and stone, to the surface.

The coupling must also be sufficiently adaptable to take into account changes in vertical and horizontal alignment of the cars and to enable the coupling to be coupled and uncoupled when cars are on reasonable curves that exist on rail roads.

The object of the present invention is to provide a simple coupling which fulfils these desiderata and which is a safe and efficient general purpose coupling.

One of the disadvantages of certain couplings at present in use is that in order to couple and uncouple mine cars it is essential for an attendant to carry out an operation whereby his hand, foot or head becomes positioned between mine cars, thus running the risk of injury; another disadvantage resides in the fact that a loose component part of the coupling needs to be manually positioned into co-acting engagement with a pair of adjoining couplings.

Another object of the invention in one of its forms is to enable the coupling to be operated from a side of the mine car without it being necessary for the operator to place any part of his body between cars and a further object is to provide for the couplings to be positioned unobtrusively when in uncoupled position in order to facilitate the taking of mine cars into cages for lifting to the surface.

According to the present invention, a coupling for rail road vehicles comprises a pair of buffing members, each member being adapted to be pivotally connected at one end to vehicle draw gear and each having a buffing face at the other end lying in a vertical plane which is at right angles to the axis of each member, at least one of said buffing members having a central vertical entry gap in its buffing face and a seating in the rear of said face, a coupling arm comprising a shank and a spherical head at one end of the shank, pivot means connecting the other end of said arm about a central fixed horizontal axis to the other buffing member, said spherical head being adapted to engage said seating and manually operable means connected to said coupling arm adapted to engage said head with said seating and for effecting disengagement of said head.

Each of the buffing members may be provided with a pivoted coupling arm of which one is arranged to be rendered inactive or captive while the other couples the buffing members.

Preferably, the coupling arm or link has a partly spherical head at its free end to engage a corresponding spherical seating behind the entry gap in a buffing member and the portion of the arm adjacent the head, which passes through the entry gap, or the major part of the arm may be of circular cross-section. Each entry gap is, preferably, approximately of V-shape with curved entry wings for facilitating the entry of the coupling arm into the entry gap. This spherical seating also permits the coupling arm to oscillate in a vertical plane when change in gradient occurs. Segmental supports or ledges, provided near each seating, serve to support the head of the coupling arm during shunting or buffing of mine cars and ensure that the said head will be guided into its seating when hauling takes place after shunting.

Another feature of the invention is the provision on each buffing member, adjoining its entry gap, of a locking device which whilst it allows a coupling arm of one buffing member to engage the entry gap of a mating buffing member it operates to lock the arm against disengagement until the device is moved into a position of release, so that accidental uncoupling will be avoided.

This locking device may consist of a pawl or latch in the form of a biased (spring-loaded or weighted) lever mounted on a buffing member and co-acting with an abutment thereof and operating in such a manner that the lever must be intentionally moved to effect release of the coupling arm.

When the coupling arm is entering the entry gap of a mating buffing member, the said arm co-acts with the lever and rocks it automatically so that the arm can engage the seating in the head, whereas after entry, the bias of the lever restores it into a position of safety against the abutment.

Other details of construction and provision for raising and lowering the coupling arms will be now described in detail with reference to the accompanying drawings which illustrate by way of example a coupling for a mine car, and some alternative forms of the coupling:

Figure 1 is a perspective view of the coupling of which one buffing member is fitted to draw gear of a mine car, sufficient of which is shown for the purpose of illustration; it is assumed that the other member will be similarly fitted to an end of an adjoining mine car and that identical couplings will be incorporated throughout a train of cars.

Figure 2 is a plan of the coupling Figure 1.

Figure 3 is a sectional end view of one of the members with a coupling arm (of a mating member) engaging the seating in the entry gap and showing the operative position of the safety catch.

Figure 4 is a longitudinal sectional detail showing a head of one coupling arm co-acting with the seating in an entry gap of a mating member, which seating forms an abutment during haulage and a bearing for the coupling arm as it turns about its axis during tippling of its associated mine cars.

Figure 5 is a sectional side elevation of the coupling and showing the relative positions of coupling arm raising and lowering mechanism on the respective ends of mine car bodies indicated in dotted lines.

Figure 6 is a sectional detail of part of the mechanism seeen in Figure 5.

Figure 7 is an end view of the right hand mine car seen in Figure 5.

Figures 11 and 12 show diagrammatically in end view and plan the relationship when there is lateral disalignment between adjoining mine cars and occasioned by bends or curves in a rail road and the disaligned position of the coupling arm preparatory to engagement with an entry gap.

Figure 8:
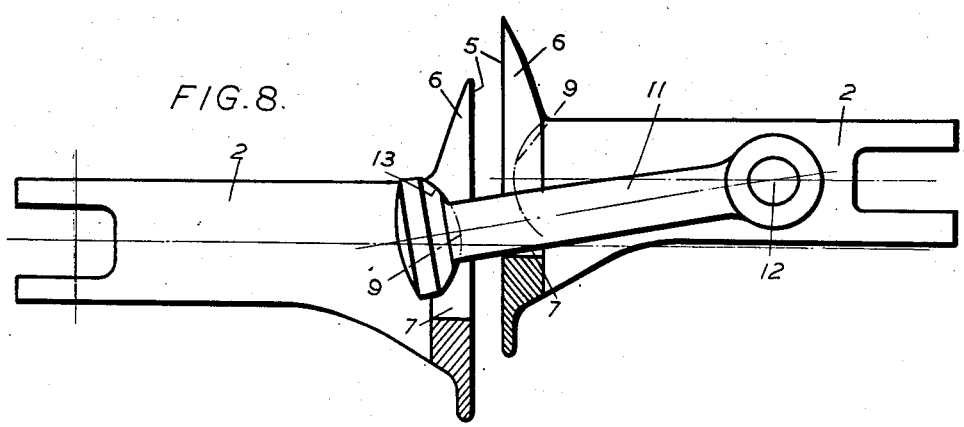
Figures 8 and 9 are diagrammatic side elevations showing the adaptability of the coupling under conditions of relative vertical disalignment between buffing members.
Figure 9:
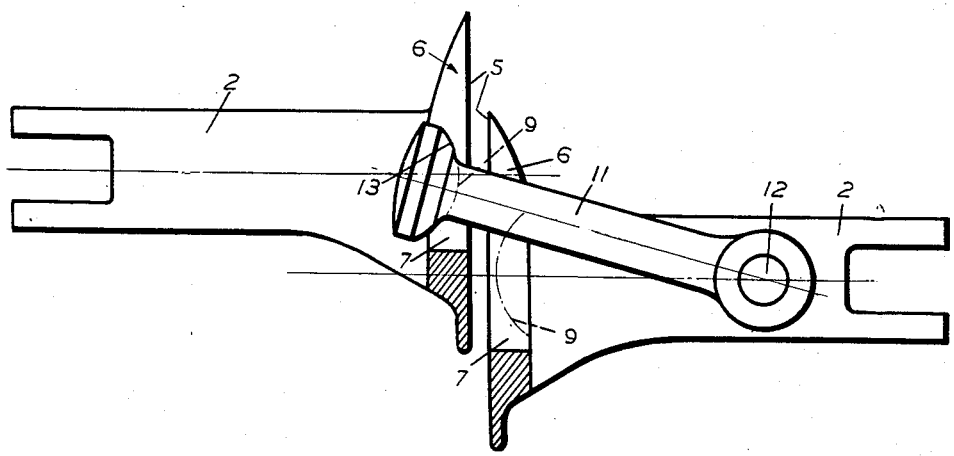
Figure 10:
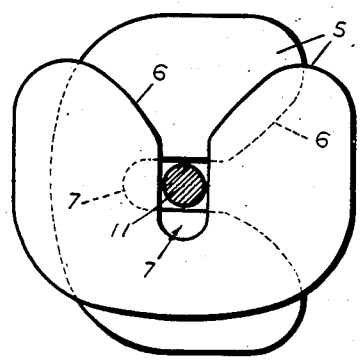
Figure 10 shows diagrammatically the relative positions of coupled buffing members during tippling and the interlocking of the parts.

Referring to Figures 1 to 12, a mine car body 1 (or a body of any rail road vehicle) has a cast steel or steel fabricated buffing member 2 pivotally connected about a vertical axis 3 to draw gear 4 arranged on the underside of the body 1 and on its longitudinal axis. This buffing member 2 has a buffing face 5 formed with an approximately V-shaped entry gap 6 the imaginary apex of which merges into a throat 7 having parallel sides 8; at the rear of the buffing face 5 this throat possesses a rounded or partly spherical seating 9. A pair of horizontal aligned ledges or segments 10 extend in a common plane at the rear of the seating 9. A coupling arm 11 is pivotally connected at its inner end to the buffing member 2 on a horizontal axis 12 and forms a permanent part of said member 2 save for replacement or servicing, the free end of the coupling arm 11 having a rounded or partly spherical head 13 to engage the seating 9 in the mating member 2. As is particularly seen from Figures 1, 2, and 5 each buffing member 2 has identical characteristics and such a member would be provided at both ends of mine cars so that no difficulty would be experienced in coupling-up when cars were turned round. In a particular instance, however, where forward and reverse traction only is envisaged, there need be a single coupling arm 11 on one member 2 and a seating 9 in the mating member 2. Each buffing member 2 is provided with a locking device for the coupling arm 11 in the form of a first order lever 14 fulcrumed transversely of the axis of the coupling on a horizontal axis 15 in a fork 16 integral with a member 2. This lever 14 is biased by its long arm 16a into engagement with a horizontal flange 17 of the member 2, (Figures 1 and 3) so that its short arm 18 normally lies over the coupling arm head 13 in the coupled position. Alternatively the lever 14 could be spring-loaded. Thus unintentional lifting of the coupling arm 11 into a disengaging position relative to a particular buffing member 2 is prevented, but intentional disengagement can be effected simply by lifting the long arm 16 and simultaneously lowering the short arm 18 out of the path in which the head 13 of the coupling arm 11 turns for disengagement. The intentional raising of the coupling arm 11 into a stowed position (Figures 1, 5, 6 and 7), and of lowering it into engagement with a seating 9 is permitted in such a manner that the operator is not required to place himself between adjoining mine cars with the attendant risk of injury to a hand or foot or other part of his body.

Figure 14:
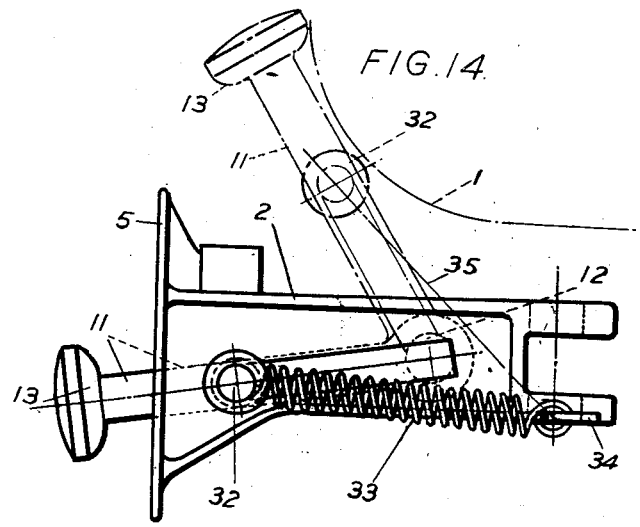
Figure 14 is a side elevation of Figure 13.
Figure 13:
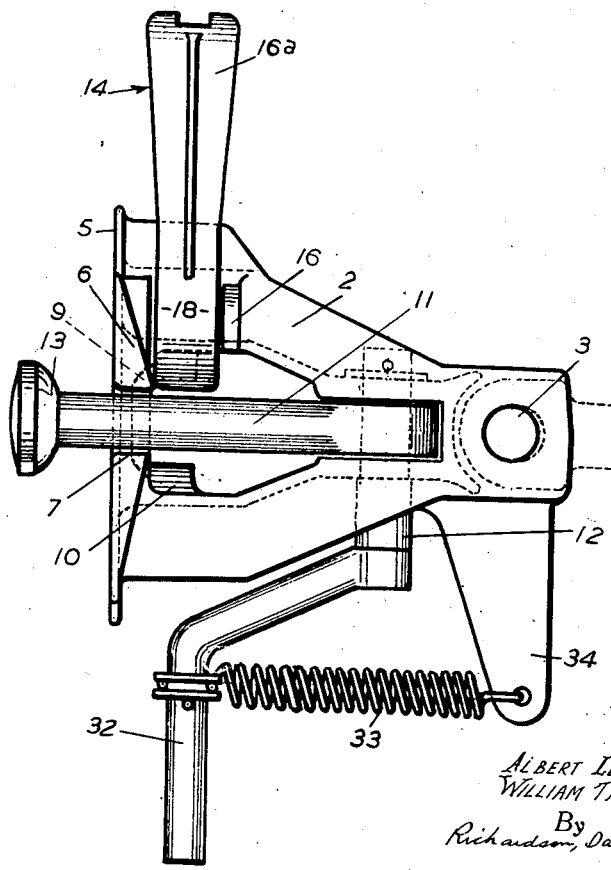
Figure 13 is a top plan of a buffing member and its safety catch and alternative means for the operation of the pivoted coupling arm.

With reference to Figures 1, 5, 6, and 7, it will be understood that what is about to be described is common to each end of a mine car so that a description of one end will suffice. Fast with the axis 12 of the coupling arm 11 is a lever 20 which is jointedly connected by a link 21 to an operating lever 22 fulcrumed at 23 to an end 24 of the mine car 1. The knob 15 of this lever 22 is readily accessible at one side 26 of the mine car without projecting beyond it and this lever 22 can swing between two stops 27 formed by the ends of a curved bracket 28 secured to the end 24. In the position of the lever 22 shown in Figure 1, the coupling arm 11 has been positively moved into a coupling position, whereas the companion coupling arm 11 on the adjoining mine car is raised into a stowed position simply by reversal of the position of the arm 22 of its associated mechanism. This position is seen at Figures 6 and 7 and the alternative positions at Figure 5. It will be understood that the raising and lowering mechanism above described may be modified as is disclosed in the specification of our concurrent application for British Letters Patent No. 31,592/48. The link 21 is conveniently spring-loaded (Figure 6) in that its upper end 29 moves piston-like in a tube 30 under bias of a compression spring 31 which is stressed when the operating lever 22 is moved upwardly so that a snapover-action is effected beyond the dead centre position. As an alternative to the operating mechanism above described, a simple but not so readily accessible mechanism is illustrated by Figures 13 and 14. Here, the axis 12 of the coupling arm 11 has a crank 32 operable by hand or foot fast therewith and is loaded by an extensible spring 33 anchored at one end to a lateral lug 34 of the buffing member 2. In the engaged positions of the coupling arm 11 as shown, the crank 32 is lowered and the overcentre position of the spring 33 relative to the axis 12 produces a snap-over action tending to maintain the coupling arm 11 in engagement with its mating buffing member 2, but permits the arm 11 to have such angular movement about the axis 12 as is required during changes in gradient. The reverse position of the crank 32 and the coupling arm 11 is shown in dotted lines in Figure 14 and again the overcentre position of the spring 33, as indicated by the dotted line 35, produces a snap-over action and holds captive the coupling arm 11 in the stowed position clear of the buffing face 5.

Assuming it is desired to tipple a mine car through 360°, as is accepted practice, the initial angular movement of a pair of buffing members 2 coupled at each end of the mine car to stationary mating buffing members of adjoining fore and aft mine cars bring about an asymmetric state between the V-shaped entry gaps 6 of buffing faces 5 as the spherical heads 13 turn in the bearings formed by the spherical seatings 9 in the mating members 2. The asymmetry of the entry gaps 6 interlocks the coupling arm 11 between the mating buffing members 2 during this turning movement, as is particularly indicated by Figure 10 independent of any other operating mechanism.

With reference to Figure 5, it will be seen that each pivot pin 3, forming the vertical axis about which the buffing member 2 is connected to the draw gear 4, is extended at its shank end and formed with opposite flats 36 which key into a horizontally directed slot 37 extending from and rigid with the fixed base 38 of the draw gear 4. This will prevent the coupling rotating relative to the mine car.

The buffing members 2 will be self-aligning and self-centring in the known manner.

The wings of each entry gap provide an adequate lead into the gap so that the shank of the coupling arm 11 may be pushed downwardly and coupling effected even when mine cars are laterally out of alignment (see Figures 11 and 12).

From the foregoing description, it will be appreciated that of a pair of buffing members 2 one or both may be provided with a pivoted coupling arm 11 and that when both are provided one of the arms is held captive when the other couples the members 2.

The following advantages, singly or combined, can be attained with the couplings:

(1) The coupling can be operated with complete safety by an operator at a side of the mine car, using a handle or pedal placed at a convenient height. There is no need for the operator to place either hand or foot between the coupling members of the mine cars. The coupling may be positively locked in either the coupled or the uncoupled position as desired.

(2) The coupling at each end of a mine car is identical; therefore, cars may be turned round without affecting their coupling action.

(3) When a coupled mine car of a train is rotated in a tippler, the rotation takes place between the buffer faces, each buffer unit remaining fixed in relation to its mine car. This avoids the complications of fixed and swivel coupling heads in pairs, with the associated problems of operating gear therefor and the difficulty of ensuring that the head returns back to normal after being rotated through 360°.

(4) After buffing, it is necessary to operate one control handle to couple. The control handle on either mine car may be operated quite optionally for bringing the coupling arm of one mine car into engagement with the entry gap of the adjoining mine car.

(5) As soon as rotation commences in the tippler, the entry gap in the one buffing member rotates relative to the entry gap in the other buffing member. This positively locks the coupling arm in position independent of any operating gear. If, however, it is desired to rotate small mine cars in pairs, some form of spring operated catch would be incorporated to maintain coupling.

(6) When the cars are buffed on a curve the buffer faces will mate together. An adequate lead in is given to the sides of the entry gaps so that the coupling arm may be pushed downwards and coupling effected even when mine cars are out of lateral alignment. The pivoted buffing members enable mine cars to run under considerable misalignment without straining the coupling.

(7) The spherical head at one end of the coupling arm and the pivotal connection to the buffing member at the other end enables the coupling arm, when coupled, to act as an oscillating link in the vertical plane and allows for vertical disalignment of mine cars.

What we claim is:

1. A coupling for rail road vehicles comprising a pair of buffing members, each member being adapted to be pivotally connected at one end to vehicle draw gear and each having a buffing face at the other end lying in a vertical plane which is at right angles to the axis of each member, at least one of said buffing members having a central vertical entry gap in its buffing face and a seating in the rear of said face, a coupling arm comprising a shank and a spherical head at one end of the shank, pivot means connecting the other end of said arm about a central fixed horizontal axis to the other buffing member, said spherical head being adapted to engage said seating and manually operable means connected to said coupling arm adapted to engage said head with said seating and for effecting disengagement of said head.

2. A coupling for rail road vehicles comprising a pair of buffing members, each member being adapted to be pivotally connected at one end to vehicle draw gear and each having a buffing face at the other end lying in a vertical plane which is at right angles to the axis of each member, at least one of said buffing members having a central vertical entry gap in its buffing face and a seating in the rear of said face, segmental supports lying in a common horizontal plane at the rear of said entry gap and at each side of said seating, a coupling arm comprising a shank and a spherical head at one end of the shank, pivot means connecting the other end of said arm about a central fixed horizontal axis to the other buffing members, said spherical head being adapted to engage said seating and to co-act with said supports and manually operable means connected to said coupling arm adapted to engage said head with said seating and for effecting disengagement of said head.

3. A coupling for rail road vehicles according to claim 1, and including a pivoted coupling arm on each buffing member for selective engagement via an entry gap with a seating on a buffing member, the manually operable means being combined with each coupling arm of which one is adapted to be rendered inactive while the other couples the buffing members.

4. A coupling for rail road vehicles comprising a pair of buffing members, each member being adapted to be pivotally connected at one end to vehicle draw gear and each having a buffing face at the other end lying in a vertical plane which is at right angles to the axis of each member, at least one of said buffing members having a central V-shaped entry gap in its buffing face and a seating in the rear of said face, segmental supports lying in a common horizontal plane at the rear of said entry gap and at each side of said seating, a coupling arm comprising a shank and a spherical head at one end of the shank, pivot means connecting the other end of said arm about a central fixed horizontal axis to the other buffing member, said spherical head being adapted to engage said seating and to co-act with said supports and manually operable means connected to said coupling arm adapted to engage said head with said seating and for effecting disengagement of said head.

5. A coupling for rail road vehicles comprising a pair of buffing members, each member being adapted to be pivotally connected at one end to vehicle draw gear and each having a buffing face at the other end lying in a vertical plane which is at right angles to the axis of each member, at least one of said buffing members having a central vertical entry gap in its buffing face and a seating in the rear of said face, segmental supports lying in a common horizontal plane at the rear of said entry gap and at each side of said seating, a coupling arm comprising a shank and a spherical head at one end of the shank, pivot means connecting the other end of said arm about a central fixed horizontal axis to the other buffing member, said spherical head being adapted to engage said seating and to co-act with said supports, manually operable means connected to said coupling arm adapted to engage said head with said seating and for effecting disengagement of said head, and a biassed locking lever pivoted transversely on a buffing member, said lever having an arm lying above said spherical head and being adapted to lock said coupling arm with said spherical head in engagement with said seating, said locking lever being also adapted to be turned out of the path of said head by a co-acting engagement of said spherical head with said arm.

A. L. HALE.
W. T. TOLHURST.

REFERENCES CITED

The following references are of record in the file of this patent:

UNITED STATES PATENTS

| Number | Name | Date |
|---|---|---|
| 476,008 | Flanagan | May 31, 1892 |
| 478,492 | Woolf | July 5, 1892 |
| 487,367 | Gibson | Dec. 5, 1892 |
| 516,304 | Gudmunsen | Mar. 13, 1894 |
| 536,894 | Renne | Apr. 2, 1895 |
| 548,666 | Shelton | Oct. 29, 1895 |
| 742,317 | Harvey et al. | Oct. 27, 1903 |
| 752,605 | Thomas | Feb. 16, 1904 |
| 2,407,449 | Ramsey | Sept. 10, 1946 |